US011002666B2

(12) United States Patent
Fauconier et al.

(10) Patent No.: US 11,002,666 B2
(45) Date of Patent: May 11, 2021

(54) BISTATIC ELECTRO-OPTICAL DEVICE FOR SUBSTANCE-ON-SURFACE CHEMICAL RECOGNIZER

(71) Applicants: Richard Fauconier, Andover, MA (US); Mandoye Ndoye, Tuskegee, AL (US); Webert Montlouis, Columbia, MD (US)

(72) Inventors: Richard Fauconier, Andover, MA (US); Mandoye Ndoye, Tuskegee, AL (US); Webert Montlouis, Columbia, MD (US)

( * ) Notice: Subject to any disclaimer, the term of this patent is extended or adjusted under 35 U.S.C. 154(b) by 0 days.

(21) Appl. No.: 16/563,857

(22) Filed: Sep. 7, 2019

(65) Prior Publication Data

US 2020/0080931 A1 Mar. 12, 2020

Related U.S. Application Data

(60) Provisional application No. 62/730,516, filed on Sep. 12, 2018.

(51) Int. Cl.
*G01N 21/25* (2006.01)
*G01N 21/84* (2006.01)
*G01N 21/27* (2006.01)

(52) U.S. Cl.
CPC .......... *G01N 21/255* (2013.01); *G01N 21/27* (2013.01); *G01N 21/8422* (2013.01);
(Continued)

(58) Field of Classification Search
CPC .. G01N 21/255; G01N 21/27; G01N 21/8422; G01N 2021/8427; G01N 2201/021; G01N 2201/06113
See application file for complete search history.

(56) References Cited

U.S. PATENT DOCUMENTS

| 7,011,171 B1* | 3/2006 | Poulter | B60B 15/023 |
| | | | 180/65.1 |
| 2017/0292919 A1* | 10/2017 | Mccollough | G01R 27/06 |

OTHER PUBLICATIONS

"Optical fundamentals of an adaptive substance-on-surface chemical recognizer," Proc. SPIE 10433, Electro-Optical and Infrared Systems: Technology and Applications XIV, 1043300 (Oct. 6, 2017); doi: 10.1117/12.2278579 by Richard Fauconieretal. (Year: 2017).*

(Continued)

*Primary Examiner* — Jamil Ahmed
(74) *Attorney, Agent, or Firm* — William Mansfield

(57) ABSTRACT

A system for facilitating the measurement of optical parameters of a substance sitting on a surface, so that identification of the substance by reflectance spectroscopy can be made without ambiguity; the system comprises a structure using a bistatic arrangement and an accompanying method to limit, to just two beams, the propagation of light from a laser transmitter capable of producing coherent light of multiple wavelengths, via an interposed transparent dielectric, to a receiver thereby preventing multiple reflections within the transparent dielectric from reaching the receiver; and the bistatic arrangement comprises a multi-wavelength laser transmitter and a receiver mounted on a telescoping boom, with both the laser transmitter and receiver being independently orientable, with the positions and orientations of the laser transmitter, the receiver and the telescoping boom electronically sensed at all times.

5 Claims, 3 Drawing Sheets

(52) U.S. Cl.
 CPC ........... *G01N 2021/8427* (2013.01); *G01N 2201/021* (2013.01); *G01N 2201/06113* (2013.01)

(56) References Cited

OTHER PUBLICATIONS

Olaf Stenzel, The Physics of Thin Film Optical Spectra, 2005, 71-95, 104-110, 116-120, Springer-Verlag, Berlin, Germany.

\* cited by examiner

BISTATIC ELECTRO-OPTICAL DEVICE FOR SUBSTANCE-ON-SURFACE CHEMICAL RECOGNIZER

CROSS-REFERENCE TO RELATED APPLICATIONS

The present Utility patent application claims priority benefit of the [U.S. provisional application for patent Ser. No. 62/730,516, entitled "BISTATIC ELECTRO-OPTICAL DEVICE FOR SUBSTANCE-ON-SURFACE CHEMICAL RECOGNIZER", and filed on Sep. 12, 2018 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

TECHNICAL FIELD

The technical field of this invention is the use of a bistatic optical instrument for substance-on-surface chemical recognition.

BACKGROUND

There has long been a need for an optical instrument for substance-on-surface chemical recognition which allows the measurement of unknown optical properties of an interrogated chemical. Optical variables have long plagued the results of monostatic infrared chemical recognisers with ambiguity, by virtue of being unknown and difficult to measure in real time outside of a controlled laboratory setting: unknown optical properties of the supporting surface beneath the chemical layer, unknown thickness and refractive index of the chemical film, and (3) unknown angles of incidence and detection. All previous methods for determining said optical properties are inaccurate and ambiguous.

SUMMARY

In one embodiment, optical measurements are completed by a device comprising a bistatic arrangement of a laser transmitter and a receiver, mounted on a telescoping boom, with both said arrangement of laser transmitter and said receiver being independently orientable, with the positions and orientations of said arrangement of laser transmitter, said receiver and said telescoping boom electronically sensed at all times.

In another embodiment, the aforementioned device further comprises one or more fiber optic waveguides for routing light from transmitter to receiver.

In another embodiment, the aforementioned device further comprising a computer, or link to a computer, whereby data produced by the device may be computed, stored and subjected to calculations, motion of any or all of the electronically controllable components of the device may be controlled, and transmission of data within the device, and to and from the device, may be controlled.

In another embodiment, the thickness of a transparent dielectric film, sitting free on any surface, can be measured via measurement of the refractive index of said transparent dielectric film wherein film thickness and refractive index are thereby not ambiguous.

In another embodiment, the aforementioned system comprising a structure using a bistatic arrangement and an accompanying method to limit, to just two beams, the propagation of light from a laser transmitter, via an interposed transparent dielectric, to a receiver thereby preventing multiple reflections within said transparent dielectric from reaching said receiver.

In another embodiment, the aforementioned system further comprising the ability to measure the thickness of a transparent dielectric film, sitting free on any surface, with no prior preparation of the film, no contact with or handling of the film and no foreknowledge whatsoever of the film's chemical makeup; the ability to measure the refractive index of a transparent dielectric film, sitting free on any surface, with no prior preparation of the film, no contact with or handling of the film and no foreknowledge whatsoever of the film's chemical makeup; and the capability to eliminate film thickness and refractive index as ambiguity contributors, in the stand-off identification of chemical substances on surfaces.

In another embodiment, the aforementioned system further comprising the ability to measure the refractive index of the bare part of a surface.

In another embodiment, a method to accompany the aforementioned system for finding the refractive index of a surface, comprising: illuminating said surface with a linearly polarized beam of known intensity, at a known angle of incidence, with polarization parallel to the plane of incidence, placing the receiver to intercept the beam reflected from the surface, measuring the intensity of the received beam, illuminating said surface with a linearly polarized beam of known intensity, at a known angle of incidence, with polarization perpendicular to the plane of incidence, placing the receiver to intercept the beam reflected from the surface, measuring the intensity of the received beam, determining the refractive index of the surface by solving simultaneous Fresnel equations using the known transmitted and measured received intensities, the known angles of incidence, and the known refractive index of air or the medium enveloping the aforementioned device.

In another embodiment, a non-contact method for measuring the refractive index and thickness of a layer of a transparent or semi-transparent substance that is upon a supporting surface, without any need for manipulation of said layer, comprising: the illumination of said layer with an illuminating beam of coherent light that is frequency modulated or phase modulated, so that the forward scattered light, that is, light reflected from and refracted through said layer, is collected by a receiver, the collection of only two beams of the frequency modulated or phase modulated forward scattered light, of which the first emergent beam has passed through said layer, reflected off its bottom boundary and thence entered a receiver, while the primary reflected beam has reflected off the top surface of the layer and thence entered the receiver, allowing the two said collected modulated beams to interfere, so that beats are produced, determining the beat frequency of the beat interferogram of the said two collected modulated beams, determining the optical path difference between the said two collected modulated beams from the aforesaid beat frequency, determining a second beat frequency by allowing the primary reflected beam to interfere with a reference beam that has passed through a known length of optical fiber or other waveguide to reach the receiver, determining, from the second beat frequency, the optical path difference between the paths taken by the reference beam and the primary reflected beam to reach the receiver, determining the refractive index and thickness of the layer by solving simultaneous equations using the two optical path differences, the separation between the primary reflected beam and the first emergent beam, and the angle of incidence of the illuminating beam upon the layer.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 also depicts one of the fiber optic connections between them.

Figure 1:
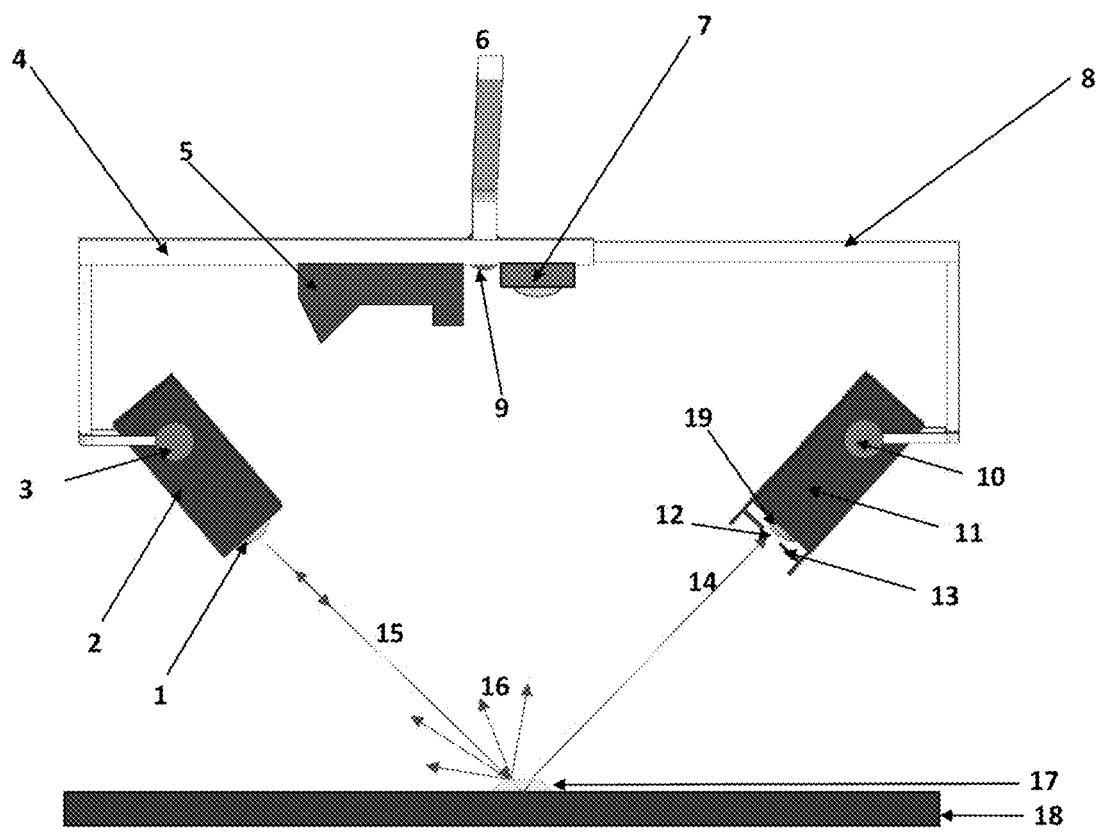
FIG. 1 is a view of the bistatic sensor system (Bistatic Electro-Optical Device).

Unless otherwise indicated illustrations in the figures are not necessarily drawn to scale.

DRAWINGS—REFERENCE NUMERALS

1. Lens
2. Transmitter module (visible & mid-infrared laser source)
3. Motor with angular position encoder (orients transmitter module 2 and senses its orientation)
4. Fixed boom
5. Laser profilometer and rangefinder
6. Handle
7. Auxiliary camera
8. Telescoping boom
9. Motor with angular position encoder (drives telescoping boom by converting its rotational motion into prismatic motion of said boom—which can be done with a rack-and-pinion mechanism in one embodiment—and senses the position of said boom by inference from its own angular position)
10. Motor with angular position encoder (orients receiver module 11 and senses its orientation)
11. Receiver module
12. Aperture, of variable size
13. Diaphragm, controls size of aperture 12.
14. Ray of light, incident on receiver 11, after having travelled through sample 17.
15. Path of a ray of light, which is emitted from transmitter 2, or directly reflected back to it from sample 17.
16. A ray of light, which has been backscattered from sample 17.
17. Sample of a substance to be analyzed.
18. Substrate supporting the substance 17.
19. Converging lens
20. Quantum cascade laser (QCL)
21. Quantum cascade laser (QCL)
22. Laser sub-module
23. Laser sub-module
24. Mirror
25. Semitransparent mirror
26. Semitransparent mirror
27. Semitransparent mirror
28. Converging lens on motorized mount
29. Photodetector for QCL infrared (IR) laser light
30. Converging lens
31. Polarizer used as an analyzer
32. Converging lens
33. Converging lens
34. Polarizer used as an analyzer
35. Polarizer used as an analyzer
36. Galvanometer-mounted converging mirror
37. Fiber optic coupler
38. Photodetector
39. Optical fiber linking transmitter and receiver modules (one of many such fibers)
40. Optical fiber
41. Ray of light entering receiver (usually as part of a parallel beam)
42. Ray of light entering receiver (usually as part of a parallel beam)
43. Frequency modulated continuous wave (FMCW) laser
44. Converging lens
45. Optical fiber
46. Optical Splitter
47. Optical fiber
48. Converging lens
49. Modulated beam (if modulation of 43 is turned on)
50. Cage cube-polarizing beam splitter
51. Geared edge quarter wave plate
52. Electronically controlled shutter
53. Motor with geared-end shaft-controls elliptical polarization
54. Electronically controlled shutter
55. Mirror
56. Mirror
57. Semitransparent mirror
58. Beam of linearly polarized light
59. Beam of linearly polarized light
60. Beam of linearly polarized light
61. Beam of linearly polarized light
62. Beam of light that is linearly polarized, or elliptically polarized, or both, depending on the state (closed or open) of shutter 54.
63. Beam of elliptically polarized light

DETAILED DESCRIPTION—FIRST EMBODIMENT

Some embodiments may provide a bistatic electro-optical device for a substance-on-surface chemical recognizer, and a method of using it. In this patent application the phrase "bistatic sensor system" will be used interchangeably with "Bistatic Electro-Optical Device".

The primary purpose of this present invention is to facilitate the measurement of optical parameters of a substance sitting on a surface, so that identification of the substance by reflectance spectroscopy can be made without ambiguity. Reflectance spectroscopy is a well-established substance identification technique, but, in the field, it is done presently with monostatic equipment, in which the source of the laser light and the receiver of the returned laser light are co-located. This leads to considerable ambiguity in the determination of the substance's identity. The ambiguity is caused by variations in sample thickness, multiple reflections from the sample and supporting substrate, uncertainty of the interrogatory beam's location, and uncertainty of where the beam is illuminating (sample? Substrate? Or partially sample and partially substrate?).

The apparatus has advantages in identifying the chemical composition of (isotropic and homogeneous) thin liquid and gel films on various surfaces by their infrared reflectance spectra. The bistatic optical sensing device contains a multi-wavelength laser source and a detector which are physically displaced from each other. With the aid of the apparatus, key optical variables can be measured in real time. The variables in question (substance thickness, refractive index, etc.) are those whose unobservability causes many types of monostatic sensor (in use today) to give ambiguous identifications. Knowledge of the aforementioned key optical variables would allow an adaptive signal-processing algorithm to make unambiguous identifications of the unknown chemicals by their infrared spectra, despite their variable presentations. Within the receiver of the apparatus is an aperture that limits the interrogatory beams to a coherent pair, rejecting those resulting from successive multiple reflections. This permits the determination of the necessary optical variables which permit unambiguous identification. One important optical parameter of the substance-to-be-identified is the thickness of the sample. Frequency modulation can produce easily measurable beat frequencies for determination of sample thicknesses on the order of microns to millimeters. Also shown is how the apparatus's polarization features allow it to measure the refractive index of any isotropic, homogeneous dielectric surface on which the unknown substance can sit. Measurement of all of these aforementioned variables facilitate a reduction in ambiguity of substance identification. A monostatic instrument would only be able to rely on the backscatter shown in the FIG. 1 to determine the identity of the unknown substance.

FIG. 1 shows the major physical parts of one embodiment of the invention. An orientable transmitter module 2 transmits coherent light which is received by orientable receiver module 11. Transmitter 2 can elect to transmit light that is frequency modulated or unmodulated, or both, and in any part of the spectrum: in one useful embodiment this light can be infrared or visible or both. In the main use contemplated for this invention, the light from 1 is directed to pass through a transparent or semitransparent substance 17 before reaching 11. Substance 17 is usually supported by some substrate or surface 18, such as a floor or tabletop.

Orientation of 2 and 11 is done by their motors 3 and 10 respectively, each motor having its own angular position encoder, thereby sensing the orientation in which it has placed its module. Further positioning of 11 is done by a telescoping boom 8, which gives prismatic motion to 11 in addition to its rotational orientation. Telescoping boom 8 is driven by motor 9, also with its own angular position encoder. Motor 9 drives telescoping boom 8 by converting the motor's rotational motion into prismatic motion of said boom—which can be done with a rack-and-pinion mechanism in one embodiment—and senses the position of said boom by inference from its own angular position. Fixed boom 4 is hollow in the embodiment shown, so as to house the rack-and-pinion mechanism that drives telescoping boom 8. The apparatus is manipulated by its handle 6, which can be attached to a robotic arm or other mechanism, or can be held directly by a human operator.

Other sensors for sensing the orientation and inertial state of the entire apparatus are also attached to its frame, but are not shown here. For example, an inclinometer can sense the tilt of the frame (its roll and pitch angles), a 3-axis gyroscope can sense its angular velocity about its roll, pitch and yaw axes, and accelerometers can sense its acceleration in 3-dimensional space. The data from such sensors can be used to correct for the unsteady hand holding of a human operator.

A camera 7 takes video or still pictures of the scene, and transmits those images to a computer screen or other screen, allowing the operator of the device a recordable means of seeing how the light from 2 is illuminating the sample 17, for example, whether the light is hitting the sample or missing it entirely. A laser profilometer-and-rangefinder 5 gives mensuration data on the profile of the supporting surface 18 (which can be curved or straight) in the immediate vicinity of the sample, thereby allowing its local curvature to be accurately determined. The profilometer-and-rangefinder 5 also gives the distance between the fixed boom on which it is located and the supporting surface.

In this invention, anything that gathers data or requires a command is connected to a control computer, which is not shown. The data and electrical connections between the apparatus and its control computer are common wireless or wired connections, and are not shown here. Among other tasks, the computer can interpret infrared spectra, display them on a screen or store them, and control the operation of the invention's components by means of commands typed in by the operator, or automatically, as its programming dictates.

A fuller description of the invention requires a deeper description of two of its most important components, the transmitter and receiver. These will now be described.

Description in Part—Transmitter Module

Figure 2:
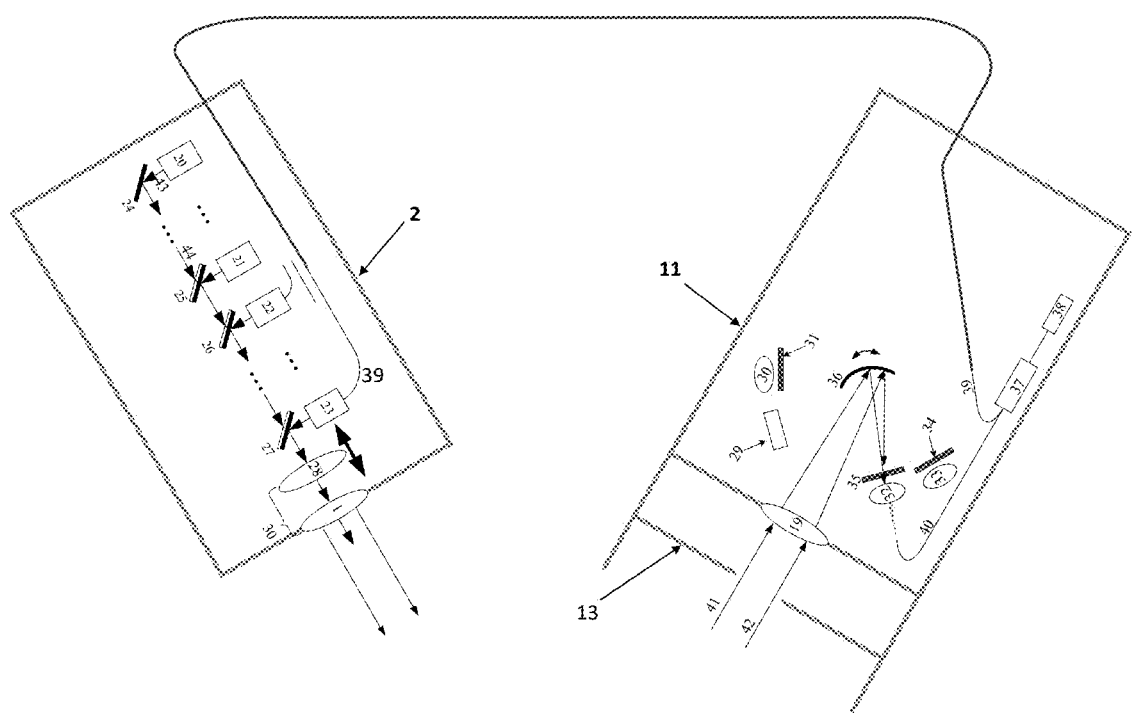
FIG. 2 is a schematic view of the internal makeup of the bistatic sensor system: its transmitter and its receiver.

A schematic diagram of the transmitter module 2 is shown in FIG. 2. Lasers 20 and 21 are unmodulated infrared quantum cascade lasers (QCLs) that illuminate the sample to provide the basic wideband reflectance/absorbance spectrum. Modules 22 and 23 are laser sub-modules producing optionally polarized and/or modulated coherent light for thickness and refractive index determination. The modulation of the light from modules 22 and 23 is frequency-modulated continuous wave (FMCW). Embodiments of this invention may be created wherein modules 22 and 23 may produce monochromatic visible light, or monochromatic infrared light.

Plane mirror 24, and semitransparent mirrors 25, 26 and 27, combine the beams from 20, 21, 22 and 23 into a single beam. Numerous other embodiments of the transmitter module are possible, for instance, additional QCLs besides 20 and 21 can be added, and additional laser sub-modules besides 22 and 23 can be added, each with its own semitransparent mirror, following the basic arrangement laid out in FIG. 2. The arrangement of a fixed lens 1 and a motorized, movable lens 28, constitute a collimator 30.

An important part of the system is an optical fiber 39, via which FMCW light from laser sub-module 23 is combined with FMCW light at the receiver that is directed onto optical fiber 40, by lens 32. The combination of the two streams of FMCW light is done by means of the fiber optic coupler 37, and the mixed FMCW light stream is conveyed thence to a photodetector 38, which detects any beat frequency in the mixed light streams and provides its data to the control computer. This direct fiber optic link between 23 and 32 is necessary to determine the path difference between
  (i) the total light path (of unknown length) taken through sample 17 by rays 15 and 14 and
  (ii) the known path taken by light through 39.

Reference [1] shows how this path difference can be calculated using the beat frequency of the FMCW light. Reference [1] also shows how this path difference can be used to calculate the thickness of the sample 17, a necessary datum to use in removing ambiguities from the infrared reflectance/absorbance spectrum of 17.

Note the manner in which laser sub-module 23 is fiber-optically connected via 39, to photodetector 37, to form an optical circuit consisting of 23, 35, 32 and 40, 39, 37 and 38. Laser sub-module 22 is similarly matched to analyzer-and-lens pair {34, 33} to form a similar optical circuit, of which the only components not shown and comparable to those previously described are
  (i) a photodetector,
  (ii) fiber optic coupler,
  (iii) connecting optical fiber between 22 in the transmitter and its matching fiber optic coupler in the receiver,
  (iv) optical fiber connecting analyzer-and-lens pair {34, 33} to its fiber optic coupler, Any additional laser sub-modules, as may be used in other embodiments, must be connected in separate optical circuits in the same manner as 23's optical circuit.

Note that the QCLs 20 and 21 are not connected in optical circuits as 23 is. QCLs are not laser sub-modules for the purposes of this discussion. All QCLs have their transmitted light ultimately received at the single photodetector 29. However, other embodiments allow for the receipt of light from individual QCLs at separate photodetectors.

Description in Part—Laser Sub-module

Figure 3:
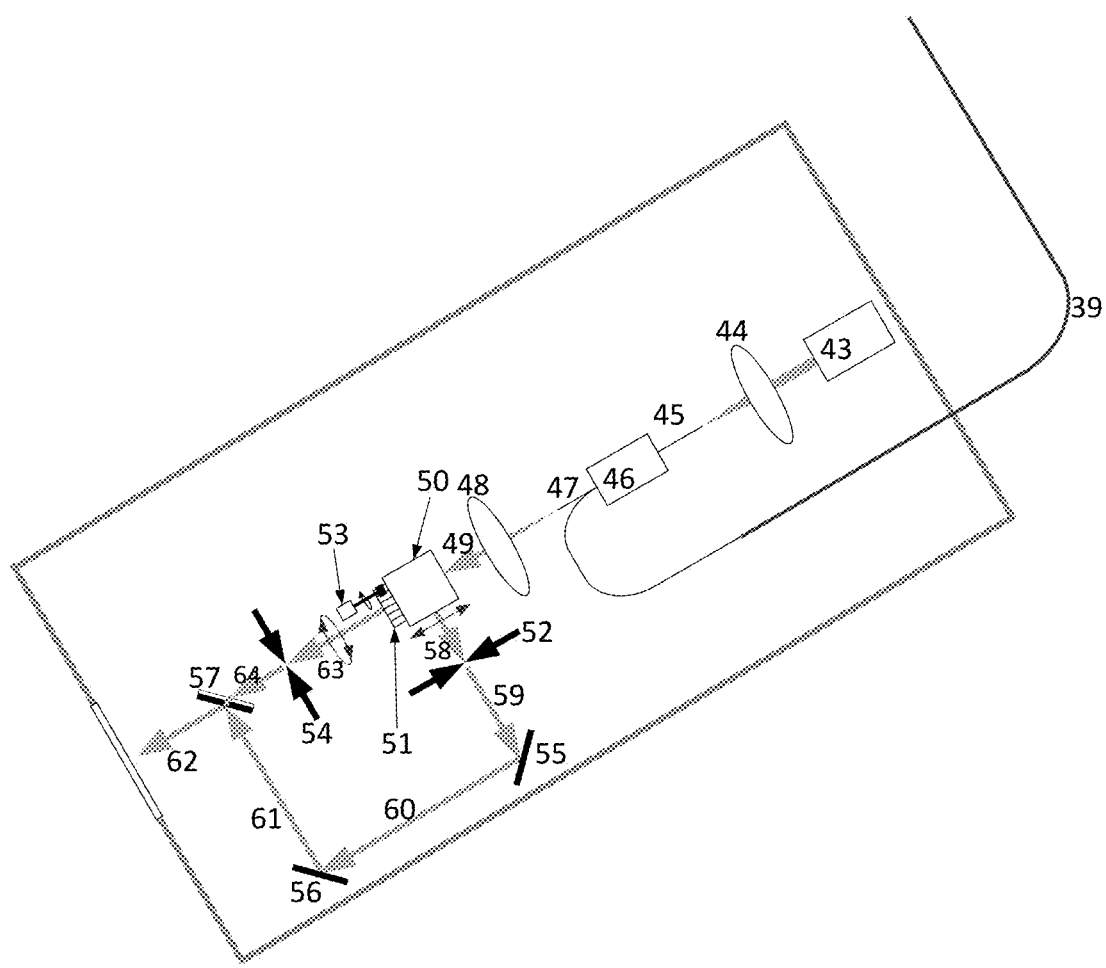
FIG. 3 is a schematic view of the makeup of one of the visible-light laser submodules in the transmitter module.

FIG. 3 is a schematic depiction of the makeup of laser submodule 23. Laser 43 produces FMCW coherent light which is focused by converging lens 44 into optical fiber 45. Optical splitter 46 diverts a portion of this light through optical fiber 39, while the rest passes through optical fiber 47 and is made into a parallel beam 49 by converging lens 48. From 49, polarizing beam splitter 50 produces a linearly polarized beam 58 and an elliptically polarized beam 63. Electronically controlled shutters 52 and 54 can block the emittance of either polarized beam upon command Mirrors 55 and 56 direct the linearly polarized beam via the paths shown by 60 and 61, onto semitransparent mirror 57, whence it is combined with elliptically polarized beam 64 to emerge as combined beam 62. Motor 53 controls the polarization of beam 63 and can change the polarization of 63 from elliptical to circular. The components of the laser sub-module described in this section, together with the receiver features for receiving polarized light (described below) constitute a means for the measurement of the refractive index of a bare surface.

Description in Part—Description of the Rest of the Receiver Module

The rest of the receiver module depicted schematically in FIG. 2 is now described. Rays of light 41 and 42 enter the receiving module's converging lens 19, thence are directed onto converging mirror 36. Converging mirror 36 is galvanometer-mounted in this embodiment, so that, on command, it may focus light onto a choice of photodetector front ends: photodetector 29 for infrared light from the QCLs, or any one of the analyzer-and-lens pairs {31, 30}, {35, 32} or {34, 33} for polarized, visible, FMCW light. Only the fiber optic connection for analyzer-and-lens pair {35, 32} is shown. Every analyzer is motor-driven and rotatable upon command by the control computer, so that the angular orientation of its transmission axis is always known.

Converging lens 19 is also shown in FIG. 1, in which it is clear that its aperture 12 is controlled by the position and opening state of the diaphragm 13.

Description in Part—Means of Measuring Refractive Index and Film Thickness

The
  bistatic arrangement of transmitter and receiver modules,
  the at-will frequency modulation of the coherent light from the transmitter module,
  the features of the receiver module to receive modulated light and measure beat frequencies,
  the fiber-optic connections between transmitter and receiver,
  the computer,
  the fiber-optic connection between transmitter and receiver, and
  the ability of the diaphragm 13 to change its position and size in a controlled manner,
all properties described in the foregoing Descriptions in Part, together constitute
  a. a means to measure the thickness of a transparent dielectric film, sitting free on any surface, with no prior preparation of the film, no contact with or handling of the film and no foreknowledge whatsoever of the film's chemical makeup;
  b. a means to measure the refractive index of a transparent dielectric film, sitting free on any surface, with no prior preparation of the film, no contact with or handling of the film and no foreknowledge whatsoever of the film's chemical makeup; and
  c. a means to eliminate film thickness and refractive index as ambiguity contributors, in the stand-off identification of chemical substances on surfaces.

Operation

One mode of operation is as follows. The whole apparatus is placed above the sample 17. A visible light laser in transmitter 2 is turned on, without modulation, so that the operator can visually ascertain when it illuminates the sample 17. The aforementioned turned-on visible light laser could be, for example, laser submodule 23. Commanded by the control computer, motor 3 orients the transmitter 2 until it illuminates sample 17. Then motor 9 moves the telescoping boom in and out and motor 10 orients the receiver 11, until the control computer determines that maximum illumination is being received at the receiver. The aforementioned steps ensure that the transmitter and receiver are aligned so that light emitted from the transceiver and passing through the sample is received by the receiver. It also ensures that the receiver is intercepting the primary reflected beam from the sample, that is, the beam reflected off the surface of the sample.

Next, frequency modulation is turned on for the on-state laser submodule (23 in this case). With frequency modulation on, the next series of steps are designed to determine the refractive index and thickness of sample 17.

The aperture 12 of diaphragm 13 is opened gradually from zero, so that there is increasing light intensity on the detector, with zero beat frequency, because only one beam is entering the detector (the primary reflected beam coming off of the sample's top surface). The first emergent beam is the beam that emerges from the substrate adjacent to the primary reflected beam. The geometry and relationship between these two beams are discussed in more detail in Reference W. When enough of the cross-section of the first emergent beam enters the receiver, the applicable photodetector will then register a beat frequency that is proportional to a path difference that includes the product of the sample's refractive index and the thickness of the sample as a term in an algebraic sum. This beat frequency will be the beat frequency due to the interference between only two beams entering the receiver. The aperture of 13 is then narrowed again until the beats just disappear. The width of the diaphragm is then approximately the separation between the two beams. People need to make the diaphragm accurate. Reference [1] shows how to calculate the refractive index and thickness of the sample from these two pieces of information, the beat frequency for two beams and the separation between the two beams. Calculations of refractive index and film thickness should follow the method outlined therein. It should be straightforward to devise an automatic feedback control algorithm to open and close D, so that s can be measured as accurately as necessary, in real time.

The next series of steps are designed to obtain the reflectance/absorbance spectrum of the sample. The visible laser module is turned off and the QCLs are turned on and a reflectance/absorbance spectrum obtained.

The final series of steps is to determine the refractive index of the substrate. The whole apparatus is moved so that it is in a position where any light from it can only strike the bare substrate. Either visual confirmation of the actual scene or its camera-obtained image ensure this. No change should be made to the telescoping boom's most recent prismatic length nor to the most recent orientations of the transmitter and receiver. The diaphragm 12 is narrowed to the known size that admits one beam. The amplitude reflection coefficients for linear polarization perpendicular to the plane of incidence and within the plane of incidence are obtained. From the data obtained, the refractive index of the bare surface is obtained using the Fresnel formulas as shown in Reference [1].

From the data obtained in the aforementioned steps, the reflectance/absorbance spectrum of the substance 17 may be unambiguously determined using appropriate algorithms such as those in Reference [2].

Additional Embodiments

Additional embodiments of the apparatus, its individual components and its accessories are possible. For instance, the converging mirror 36 can be driven by any rotational means, not just a galvanometer, e.g., it may be mounted on a rotational stage. Also, additional or fewer analyzer-and-lens pairs, such as those depicted by {31, 30}, {35, 32} or {34, 33} can be placed in the receiver module. In the embodiment described in the foregoing paragraphs, all QCLs have their transmitted light ultimately received at the single photodetector 29. However, other embodiments allow for the receipt of light from individual QCLs at separate photodetectors. These additional photodetectors for infrared light similar to 29 can be put in place in the receiver where they are then selectable by the rotating converging mirror 36.

Data links to the control computer can be by radio link in some embodiments or by cable in others.

Advantages

Some or all embodiments of this invention may provide a bistatic electro-optical device for a substance-on-surface chemical recognizer (with circular polarization and frequency modulation of the light) and a method of using the device, the purpose of which is to remove the ambiguities that monostatic devices encounter when identifying substances on surfaces. Such embodiments make it possible, to unambiguously identify, in the field, thin liquid or gel films of unknown chemical composition (sitting on unknown surfaces), using wide band infra-red radiation. A solution for doing this is as follows:

(1) Bistatic arrangement of laser transmitter ("TX") and receiver ("RX"), mounted on a telescoping boom, with both TX and RX independently orientable, with the positions and orientations of (i) TX, (ii) RX and (iii) the telescoping boom electronically sensed at all times.

(2) With the aid of the bistatic arrangement, a structure and accompanying method to limit, to just two beams, the propagation of light from TX (via an interposed transparent dielectric) to RX—thereby preventing multiple reflections within the transparent dielectric from reaching RX.

(3) The laser light is composed of a wide spectrum of frequencies, visible and infra-red, the infrared achieved by several quantum cascade lasers and the visible by several colors of light: these light sources can be frequency-modulated at will. The frequency modulation enables distances to be measured, and hence the thickness of the thin film to be identified. You are going to have to refer to my attached provisional patent application and my published paper because there is no way I can do it justice in the constrained context of this answer field (Reference [1]—Fauconier, R., Ndoye, M. and Montlouis, W., "Optical fundamentals of an adaptive substance-on-surface chemical recognizer", SPIE Security and Defense 2017 Proceedings, Volume 10433, No. 3, Electro-Optical and Infrared Systems: Technology and Applications XIV, Warsaw, Poland, September 2017).

(4) The fact that the laser light is composed of multiple frequencies allows distance measurements to be made at frequencies which are not absorbed by the substance.

(5) Since the laser light can be made circularly polarized, and since there is a camera in the apparatus, the arrangement can be automatically moved to sample bare surfaces to compute the refractive index of the supporting surface by Fresnel's equations.

(6) The arrangement allows the refractive index and thickness of the interrogated film to be determined, by the equations in my paper (again Reference [1]).

(7) A laser profilometer also aids in determining the shape of the surface on which the interrogated thin film rests, which aids in the calculations.

Distinguishing features: (1) Bistatic arrangement of laser transmitter ("TX") and receiver ("RX"), mounted on a telescoping boom, with both TX and RX independently orientable, with the positions and orientations of (i) TX, (ii) RX and (iii) the telescoping boom electronically sensed at all times. (2) With the aid of the bistatic arrangement, a structure and accompanying method to limit, to just two beams, the propagation of light from TX (via an interposed transparent dielectric) to RX—thereby preventing multiple reflections within the transparent dielectric from reaching RX.

Analogous art would be bistatic radars, but these are presently not generally set up to determine the parameters that my device is set up to determine. Nevertheless, a bistatic radar that were set up totally analogously to my electro-optical device should be able to determine atmospheric parameters between TX and RX, or ground parameters between TX and RX, which would help in military radars, weather radars and ground-penetrating radars that identify IEDs (improvised explosive devices) and other buried objects.

The new capabilities which are not even contemplated by existing approaches are (1) the ability to measure the thickness of a transparent dielectric film, sitting free on any surface, with no prior preparation of the film, no contact with or handling of the film and no foreknowledge whatsoever of the film's chemical makeup (2) the ability to measure the refractive index of a transparent dielectric film, sitting free on any surface, with no prior preparation of the film, no contact with or handling of the film and no foreknowledge whatsoever of the film's chemical makeup (3) as a result of (1) and (2) and accompanying algorithms, the capability to eliminate film thickness and refractive index as ambiguity contributors, in the stand-off identification of chemical substances on surfaces.

REFERENCES

The main references for this invention are
[1] Fauconier, R., Ndoye, M. and Montlouis, W., "Optical fundamentals of an adaptive substance-on-surface chemical recognizer", SPIE Security and Defense 2017 Proceedings, Volume 10433, No. 3, Electro-Optical and Infrared Systems: Technology and Applications XIV, Warsaw, Poland, September 2017.
[2] Stenzel, O., [The Physics of Thin Film Optical Spectra], Springer-Verlag, Berlin, Germany, 71-95, 104-110, 116-120 (2005).

CONCLUSION, RAMIFICATIONS AND SCOPE

The primary purpose of this present invention is to facilitate the measurement of optical parameters of a substance sitting on a surface, so that identification of the substance by reflectance spectroscopy can be made without ambiguity. Reflectance spectroscopy is a well-established substance identification technique, but, in the field, it is done presently with monostatic equipment, in which the source of the laser light and the receiver of the returned laser light are co-located. This leads to considerable ambiguity in the determination of the substance's identity. The ambiguity is caused by variations in sample thickness, multiple reflections from the sample and supporting substrate, uncertainty of the interrogatory beam's location, and uncertainty of where the beam is illuminating.

This method is able to do its stated tasks in an uncontrolled, non-laboratory setting. This precise ability is crucial to measuring refractive index and thickness of dielectric films in the field. In turn, the field measurement of refractive index and film thickness are critical to the unambiguous identification of substances on surfaces by their diffuse infrared reflectance spectra.

Although the description above contains many specificities, these should not be construed as limiting the scope of the embodiments but as merely providing illustrations of some of several embodiments.

What is claimed is:
1. A device comprising:
  a bistatic arrangement of a laser transmitter and a receiver, mounted on a telescoping boom, with both said arrangement of laser transmitter and said receiver being independently orientable, with the positions and orientations of said arrangement of laser transmitter, said receiver and said telescoping boom electronically sensing at all times, with
  additional sensing therein further comprising measurement of optical parameters of a transparent dielectric film sitting on a surface comprising:
  a. measuring the thickness of a transparent dielectric film, sitting free on any surface, with no prior preparation of the film, no contact with or handling of the film and no foreknowledge whatsoever of the film's chemical makeup; and
  b. measuring the refractive index of a transparent dielectric film, sitting free on any surface, with no prior preparation of the film, no contact with or handling of the film and no foreknowledge whatsoever of the film's chemical makeup; and
  c. eliminating film thickness and refractive index as ambiguity contributors, in the stand-off identification of chemical substances on surfaces.

2. The device of claim 1, further comprising:
  one or more fiber optic waveguides for routing light from transmitter to receiver.

3. The device of claim 1, further comprising:
  a computer, or link to a computer, whereby
  (i) data produced by the device is to be computed, stored and subjected to calculations,
  (ii) motion of any or all of electronically controllable components of the device is to be controlled,
  (iii) transmission of data within the device, and to and from the device, is to be controlled.

4. A method to accompany the device of claim 2 for finding the refractive index of a surface, comprising the steps of:
  a. illuminating said surface with a linearly polarized beam of known intensity, at a known angle of incidence, with polarization parallel to a plane of incidence,
  b. placing the receiver to receive the beam reflected from the surface illuminated in step (a), and measuring the intensity of the received beam,
  c. illuminating said surface with a linearly polarized beam of known intensity, at a known angle of incidence, with polarization perpendicular to the plane of incidence,
  d. placing the receiver to receive the beam reflected from the surface illuminated in step (c), and measuring the intensity of the received beam,
  e. determining the refractive index of the surface by solving simultaneous Fresnel equations using
    the known transmitted and measured received intensities,
    the known angles of incidence,
    the known refractive index of air or a medium enveloping the device.

5. A non-contact method for measuring a refractive index and thickness of a layer of a transparent or semitransparent substance that is upon a supporting surface, without any need for manipulation of said layer, comprising the steps of:
  a. illuminating said layer with an illuminating beam of coherent light that is frequency modulated or phase modulated, so that forward scattered light, which is, light reflected from and refracted through said layer, is collected by a receiver,
  b. the collection of only two beams, which are a reflected beam and a refracted beam, of the frequency modulated or phase modulated forward scattered light, of which a first emergent beam has passed through said layer, reflected off its bottom boundary and then entered the receiver, while a second reflected beam has reflected off the top surface of the layer and then entered the receiver,
  c. allowing the two said collected reflected and refracted beams to interfere, so that beats are produced, d. determining a first beat frequency of the said two collected reflected and refracted beams,
e. determining an optical path difference between the said two collected reflected and refracted beams from the said first beat frequency,
f. determining a second beat frequency by allowing the second reflected beam to interfere with a reference beam that has passed through a known length of optical fiber or other waveguide to reach the receiver;
g. determining, from the second beat frequency, an optical path difference between the paths taken by the reference beam and the second reflected beam to reach the receiver,
h. determining the refractive index and thickness of the layer by solving simultaneous equations using
   the two optical path differences,
   the separation between the second reflected beam and the first emergent beam,
   an angle of incidence of the illuminating beam upon the layer.

* * * * *